(12) United States Patent
Holmes

(10) Patent No.: US 8,666,824 B2
(45) Date of Patent: Mar. 4, 2014

(54) DIGITAL MEDIA CONTENT LOCATION AND PURCHASING SYSTEM

(75) Inventor: Steve Holmes, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 816 days.

(21) Appl. No.: 12/415,854

(22) Filed: Mar. 31, 2009

(65) Prior Publication Data

US 2009/0287583 A1 Nov. 19, 2009

Related U.S. Application Data

(60) Provisional application No. 61/047,311, filed on Apr. 23, 2008.

(51) Int. Cl.
*G06Q 30/00* (2012.01)

(52) U.S. Cl.
USPC .......................................... 705/26.1

(58) Field of Classification Search
None
See application file for complete search history.

(56) References Cited

U.S. PATENT DOCUMENTS

| | | | |
|---|---|---|---|
| 2005/0027700 A1* | 2/2005 | Turner et al. ...................... 707/3 |
| 2005/0278259 A1* | 12/2005 | Gunaseelan et al. ............ 705/59 |
| 2006/0195514 A1* | 8/2006 | Rogers et al. .................. 709/203 |
| 2007/0010195 A1* | 1/2007 | Brown et al. ................ 455/3.06 |
| 2007/0299833 A1* | 12/2007 | Viljamaa et al. ................... 707/4 |
| 2008/0066099 A1* | 3/2008 | Brodersen et al. .............. 725/35 |

* cited by examiner

*Primary Examiner* — Paul Danneman
(74) *Attorney, Agent, or Firm* — Brian Tucker; Kirton McConkie

(57) ABSTRACT

Systems and methods for locating digital media content. The systems and methods include receiving search terms from a client device through a single interface, searching a plurality of digital media content providers for digital media content using the search terms to obtain search results, sorting and organizing the search results, and returning the search results to the client device through the single interface.

12 Claims, 3 Drawing Sheets

DIGITAL MEDIA CONTENT LOCATION AND PURCHASING SYSTEM

CROSS-REFERENCE TO RELATED APPLICATIONS

This application claims the benefit of U.S. Provisional Patent Application No. 61/047,311 filed Apr. 23, 2008, which application is incorporated herein by reference in its entirety.

BACKGROUND OF THE INVENTION

1. The Field of the Invention

The present invention relates to digital content and related devices. More particularly, embodiments of the invention relate to the location and purchasing of digital media content.

2. The Relevant Technology

Digital media is becoming ubiquitous in our society. Many people have access to digital content in one form or another. Not surprisingly, there are many different types of devices that can play digital files. Personal audio players such as mp3 players can play digital audio content. Personal audio players are configured to receive digital media content from a variety of sources. These sources may provide a variety of digital media content to the personal audio players, including content provided via terrestrial RF broadcasts, satellite radio, Internet radio, podcasts, or streaming digital media content.

Since digital files are easily transferred, copyright owners are concerned about others misappropriating their rights on devices that can play digital content such as personal audio players. In fact, the rights of a user, the copyright owner, and the provider of digital content are all key concerns. As a result, content providers often provide content in a manner so as to control or limit the user's access to the digital media content consistent with the copyright owner's concerns.

While limiting a user's access to digital media under certain circumstances may have helped alleviate some copyright concerns, past approaches may have also interfered with a user's ability to obtain rights to the digital media content. For example, one approach to limiting a user's access to digital media may include providing the content in a streaming format in an attempt to prevent the user from recording the digital media content. While such an approach prevents the user from recording the digital media content, the approach also makes it more difficult to obtain rights to the digital media content.

In particular, if a user hears a piece of digital media content and wants to obtain rights to the digital media content, the user must then remember some identifying characteristic of the digital media content, locate the digital media content, and finally purchase rights to the digital media content. All of this is often done without regard to whether the user has rights to the digital media content already through a separate source.

BRIEF SUMMARY

In one example, a method of locating digital media content includes receiving search terms from a client device through a single interface, searching a plurality of digital media content providers for digital media content using the search terms to obtain search results, sorting and organizing the search results, and returning the search results to the client device through the single interface.

In another example, a method for locating digital media content for playback on an electronic device includes identifying digital media content being played back on a device, determining if a user has rights to the digital media content; and initiating a search of a plurality of digital media content providers if the user does not have rights to the digital media content.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE VARIOUS EMBODIMENTS

Figure 1:
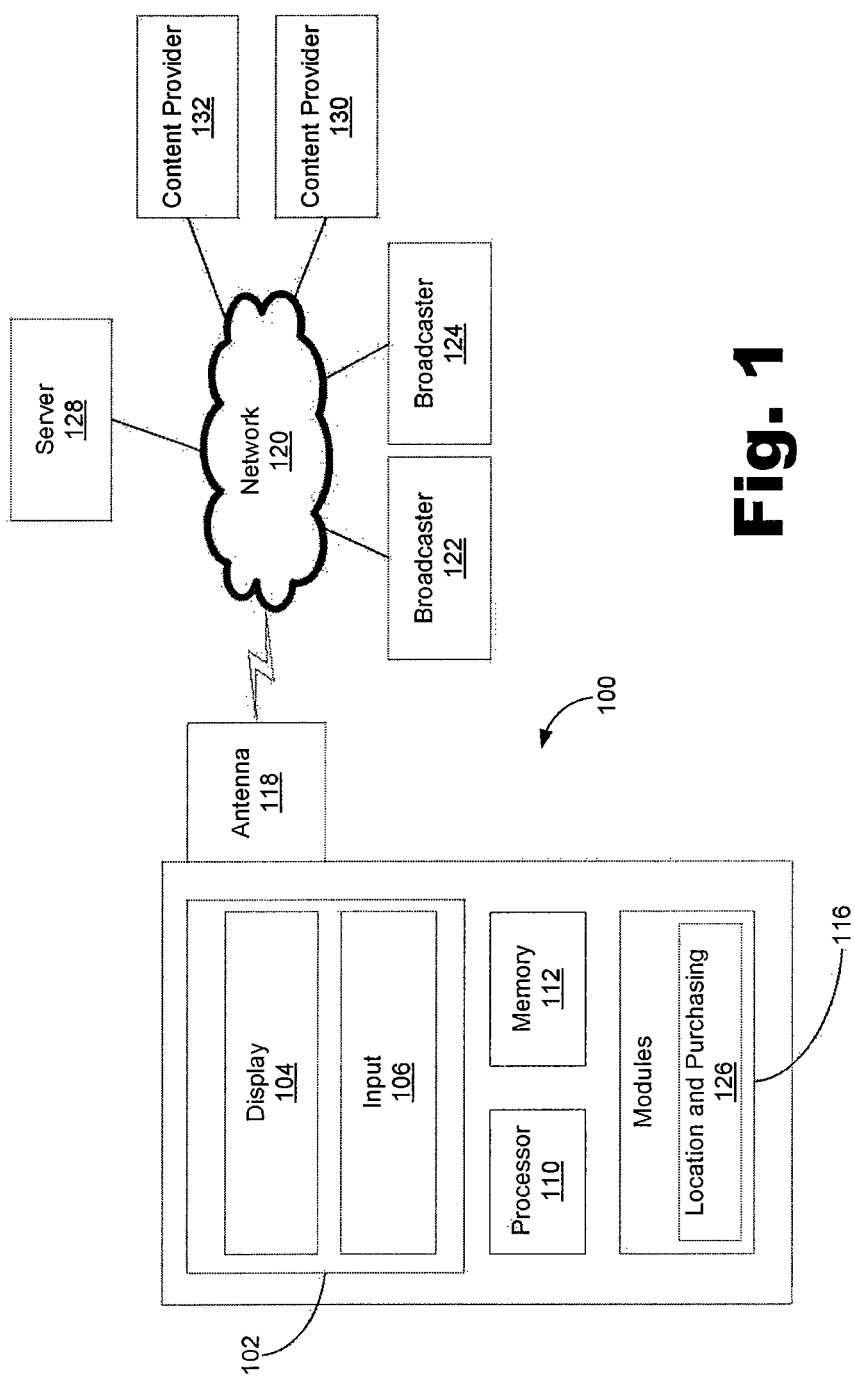
FIG. 1 illustrates an exemplary environment for implementing examples of the location and purchasing system.

Systems and methods are discussed for locating and obtaining digital media content. In particular, some examples are discussed for locating and obtaining digital media content using a personal electronic device. One of ordinary skill in the art, with the benefit of the present disclosure, can appreciate that examples can be practiced in conjunction with other devices that may include, but are not limited to, personal digital assistants, cellular telephones, personal audio devices, satellite radios, and the like or any combination thereof. By way of example only, digital media content or content refers to global network content, World Wide Web content, digital audio/video content in various formats, images in various formats, and the like or any combination thereof. In addition, as used herein digital media content shall be understood to mean digital media content that is formatted for transmission over a network.

In one example, a method and system are provided for locating digital media content from one or more content providers. A user may be able to search parameters for the digital media content from one interface or portal on a client device. The system then searches content providers using the parameters from the client device. The search performed by the system produces search results. The search results may include information about the digital media content to allow the user to compare the digital media content and/or content providers. Such an approach may increase the convenience of searching for and locating digital media content as a user is able to search any number of content providers with a single step, rather than having to search each individual content provider separately.

In addition, a method and system may be provided for locating and obtaining digital media content in a manner that allows a user to locate a piece of digital media content played back by a device. The device is able to identify information about the played-back digital media content. The system then determines whether the user has rights to the piece. If the user does not have access to the selected piece, the system will then search one or more content providers to determine which content providers have the selected piece based on preferences or other settings. One default setting may be the lowest price. Other preferences may also be set and weighted by an administrator and/or users.

The system also determines the details of obtaining the selected piece from each of the content providers, such as the price, format, other details and/or the settings and preferences described above. In addition, the system may be configured to automatically purchase the selected content or may be configured to allow the user to make a final determination on purchasing the digital media content. The content can then be delivered by the selected content provider. Embodiments of the invention can also dock with another device such as a computer for various reasons (e.g., altering stored content) and perform in a similar manner over the computer's connection.

FIG. 1 illustrates one embodiment of a device 100 that includes a platform for locating and purchasing digital media content. The device 100 may be a network connectable device being configured to access multiple types of wireless networks, including 802.11 related networks (e.g., WiFi) and others using the antenna 118. The device 100, in addition to 802.11 type networks, may have access to other radio frequency networks such as a cellular network, a satellite network, and/or terrestrial RF networks (e.g., WiMAX, AM, FM, digital audio broadcasting (DAB)).

The device 100, for example, may be able to receive digital media content from broadcasters 122 and 124. In one embodiment, the device 100 may access satellite broadcast content over the Internet rather than over a satellite network. The device 100 may also be able to access terrestrial radio broadcasts (digital radio, FM, AM, and the like). Further, the device 100 may also be able to receive and provide other digital media content, such as World Wide Web content, television content, video content and the like or any combination thereof. The network 120 represents, in one example, a wireless access point, the Internet, a local or wide area network, a satellite network, an RF network, and the like or any combination thereof.

The device 100 may also be a wireless-enabled personal music device that can access digital media content through the Internet using wireless network connections including WiFi wireless connections. The user of the device 100 can access digital media content whenever the device 100 is within range of a wireless access point or whenever access to a network is present.

The device 100 also includes a processor 110, memory 112 and various modules 116. The modules 116 represent the software or computer executable instructions that, when executed, cause the device to access networks, download content, manage content, provide and control the user interface including the display 104, record digital media content, and the like or any combination thereof. The memory 112 may store registries of the digital media content available to the user on another device, digital media content that has been recorded or purchased over the wireless connection, digital media content that is available to the user on another device, or digital media content that has been shared with the device 100 from another user.

The device 100 has a user interface 102 that includes a display 104 and an input mechanism 106. The input mechanism 106 may include, but is not limited to, a click wheel, buttons, soft keys, and the like or any combination thereof. Using the user interface 102, a user can navigate content stored on the device, configure device settings including user preferences, select channels, select specific networks, and the like.

The user interface 102 and input mechanism 106 may be used to access and interact with digital media content. A user of the device 100 may receive the digital media content over the network 120 from any number of sources, such as the broadcasters 122, 124. The user interface 102 and the display 104 in particular provide an indication of the piece of digital media content that is being played back at a given instance. For example, along with the digital media content itself, the device 100 may also receive other information from the broadcasters 122 and 124 related to the digital media content, such as the title of the piece or other details. Any portion of this information may be processed by the device 100 and may also be output on the display 104. In addition to information about the piece of digital media content currently playing, the device 100 may be further configured to store information related to digital media content that was recently played.

In either case, the device 100 also includes a location and purchasing module 126 for locating and purchasing digital media content. The location and purchasing system 126 may be one of the modules 116 residing on the device 100. The location and purchasing module 126 is configured to locate and/or purchase digital media content, such as digital media content played back by the device. In particular, an icon representing the location and purchasing module 126 may be shown on the display 104.

If a user selects the icon, the location and purchasing module 126 may then be activated. The location and purchasing module 126 may also be configured to allow a user to enter search terms using the input mechanism 106. The location and purchasing module 126 then cooperates with a server 128 over the network 120 to search content providers 130, 132. Search results may then be displayed on the display 104. A user is then able to select and purchase digital media content from the search results using the input mechanism 106. One example of a method of searching the content providers 130, 132 for digital media content using general search terms is described in more detail below with reference to FIG. 2.

Figure 3:
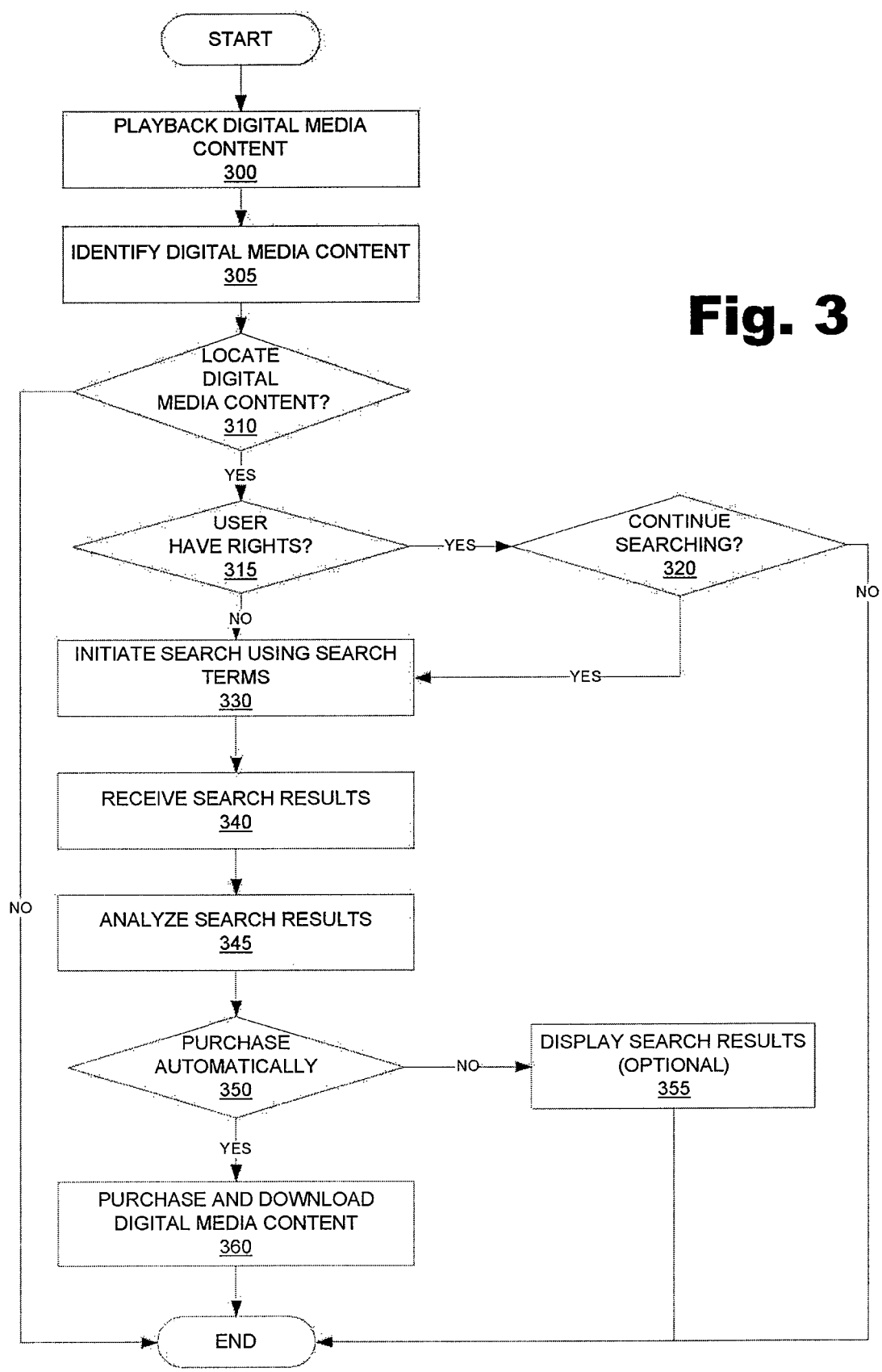
FIG. 3 is a flowchart illustrating a method of locating and purchasing digital media content according to one example.

Continuing with FIG. 1, in another example, the location and purchasing module 126 may be configured to extract search terms from information associated with the digital media content as the digital media content is being played back. The location and purchasing module 126 may then automatically search one or more content providers 130, 132 for the digital media content. If the digital media content is located, the location and purchasing module 126 may then select a content provider 130, 132 to access in order to purchase and/or download the digital media content. The location and purchasing module 126 may be configured to automatically locate, purchase, and download the digital media content when the location and purchasing module is selected. One example of such a method is described in more detail below with reference to FIG. 3 after a discussion of a general method for locating and purchasing digital media content which follows directly.

Figure 2:
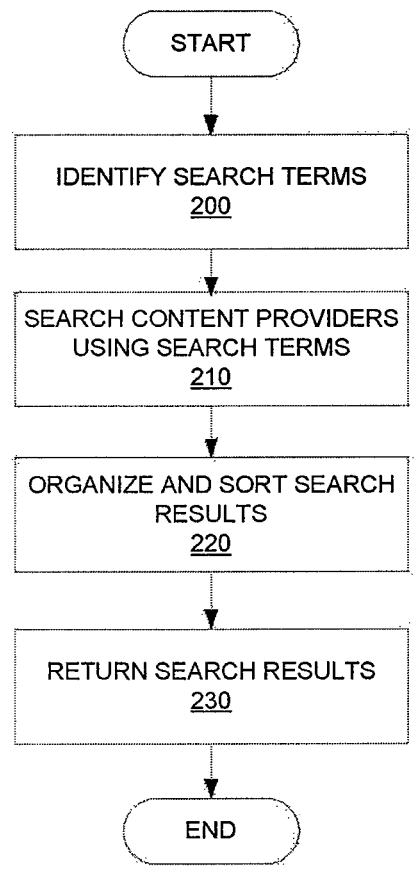
FIG. 2 is a flowchart illustrating a method of locating digital media content according to one example.

FIG. 2 is a flowchart illustrating a method of locating and organizing digital media content. The method begins at step 200 by receiving search terms that should be used to locate digital media content. Any suitable means may be used to identify the search terms. In one example, client software residing on a client device may be configured to prompt a user for search terms and to receive the search terms from the user. The server software receives these search terms from the client software, such as over a network. In particular, the server may be connected to a global network, such as the internet. Accordingly, a user is able to initiate a single search to search any number of content providers. Such an approach may facilitate searching for digital media content by allowing a user to enter the search terms at a single interface to search multiple content providers rather than entering search terms at the interface for each of the content providers.

At step 210, the server software searches content providers using the search terms received in step 200. In one example, a remote server may maintain a provider registry of a portion or all of the digital media content available from one or more content providers. The remote server may be separate or combined with the server that receives the search terms, such as the name of the artist, the title of the song, and the like. Once the search is complete, at step 220 the server software organizes and sorts the results. The search results may be sorted using preferences obtained from the user, such as preferences regarding the relative importance of various factors such as price, format, bitrate, or other factors.

At step 230, the server software returns the search results to the client. A user is then able to view the results and compare the digital media content available from the content providers. The server software provides icons or hyperlinks corresponding to the content provider and/or to the digital media content with the search results. If a user selects one of the links, the client software sends a call to the server software. In response to the call, the server software then directs the user to the content provider or other site where the user is able to purchase and download the digital media content as desired.

Accordingly, one method is provided that allows a user to search for digital media content from several content providers using a single interface in one step and to receive information related to the digital media content and/or the content providers through a single interface or portal. This method may provide increased choices for a user, thereby increasing the convenience of locating and purchasing digital media content. In the method described above, any suitable device may be used to access the server software to search for digital media content. Further, in the method described above, the server software returns results that the user may then utilize to make decisions whether to purchase the digital media content. In another example, a method is provided in which user preferences or other preferences are used to automatically locate and purchase digital media content that is being or has been played back on a digital media device. One such example will now be discussed in more detail.

The method begins at step 300 playing back digital media content. The digital media content may be played back using any suitable method or device. The present method also includes at step 305 identifying the digital media content that is being played back. Client software residing on the device is configured to identify digital media content that is being played back on the device. The digital media content played back by the digital media device may be received over a broadcast channel. The channel may be a particular stream of content and may refer to one of the channels of content offered by a satellite radio provider or to a channel of content from a terrestrial radio, online radio, or online provider of digital media content.

The client software may identify such information as the title of the piece and the artist as well as any other information that may be used in searching for the digital media content. Additionally, search terms may also be entered, as discussed above. In any case, the client software is configured to identify digital media content played back by the digital media device.

In addition to identifying digital media content being played back, at step 310, the method includes determining whether the identified digital media content is to be located. The device receives the input to select an option to proceed with location of the digital media content by way of a user interface. For example, during playback a user may select a button, key, icon, or other input to indicate that the user wishes to locate the piece of digital media content.

Once the digital media content has been selected, at step 315, the client software may then determine whether the user has rights to the selected digital media content. Those of ordinary skill in the art will appreciate that the client software may also be configured to continuously determine whether the user has rights to the digital media content being played back before the user selects a piece of digital media content to be located.

Determining whether the user has rights to the selected digital media may include searching one or more user registry. For ease of reference, a single registry will be discussed as containing information about rights a user has to digital media content. Those of ordinary skill in the art will appreciate that a user registry may be stored on the client device, on one or more remote locations such as a remote server, or in a combination of local and remote memory resources. The user registry may include information about one or libraries to which the user has rights. For example, the user registry may include a listing of digital media content stored locally on the client device as well as a listing of digital media content available remotely, such as on another of the user's device, by way of a subscription service, on a remote server, on another library, or the like.

In one example, a remote server may maintain a registry of all of the digital media content to which the user has rights and the nature of those rights. The client software may access the remote server to determine whether the user has rights to the digital media content.

In another example, one or more registries of one or more libraries may be separately maintained and separately accessed and searched by the client software. The libraries may reside on the device or elsewhere, such as on hardware that is connectable to the device or to which the client software has had or currently has access. One example of a library that resides on the device may include the user's locally stored library of digital media content. A library that may reside outside of the device may include a digital media account and/or digital media content stored on a server available through a digital media subscription service. In any case, the client software may search any number of registries and/or libraries to determine whether the user has rights to the selected digital media.

If the client software determines the user has rights to the digital media content (YES, step 315), at step 320 the client software then determines whether to continue searching. Many factors may be used in determining whether to continue with searching the digital media content even though the user has rights to the digital media content. One of these factors may include the availability of additional rights. Additional rights may include obtaining rights for a longer period. For example, a user may have rights to a piece of digital media content on a subscription basis and may wish to obtain the piece on a more permanent basis, such as by purchasing an electronic copy of the piece.

A user can configure the software to include preferences of which, if any, additional rights a user prefers to obtain over other rights. Further, user preferences may be set to continue the search if the digital media content to which the user has rights has a relatively low quality, such as digital media content with a relatively low bitrate. The client software may be configured to access these user preferences in determining whether to continue with a search of the digital media content available from content providers even though the user has rights to the digital media content. If the client software determines that searching should not continue (NO, step 320), the search ends. If the client software determines that searching should continue (YES, step 320), the client software will then search for one or more content providers for available digital media content.

At step 330, the system uses the information provided at step 310 to initiate search for digital media content. To search for digital media content, the client software may send the search terms to server software residing on one or more servers. The server software may then search the digital media content available from one or more content providers to locate the digital media content that corresponds to the search terms. In particular, the server software may maintain provider registries of digital media content available from a number of content providers. The server software may search the registries to find which digital media content meet the search criteria. The server software also determines which content providers are providing the digital media content.

Once the search is complete, at step 340, the device receives the search results from the server software. Often the digital media content will be available from more than one content provider. At step 345, the client software analyzes the search results to determine which, if any digital media content in the search results best satisfies the user preferences. These user preferences may include the price, format, bitrate, source, relevance, other preferences or combination of preferences. Further, several preferences may be used in the comparison.

Preferences may be weighted in terms of importance to the user. For example, price may be of primary importance to one user, such that if the selected digital media content is available from several sources with different characteristics, the least expensive source will be selected and the digital media content automatically purchased and downloaded. In another example, the user preferences may be selected such that only digital media content with a desired bitrate is considered and/or in a selected format is considered, after which the client software selects the cheapest digital media content that satisfies the other conditions. Those of ordinary skill in the art will appreciate that any number of user preferences may be selected and given any amount of weight in determining whether the digital media content should automatically be purchased and downloaded.

Once the client software determines which digital media content best satisfies the user preferences, at step 350, the client software determines whether to automatically purchase the digital media content based on the user preferences, if the search results satisfy user preferences associated with automatic purchase. If the client software determines that the digital media content should be automatically purchased and downloaded (YES, step 350), at step 360, the client software accesses the selected content provider to purchase and download the digital media content.

If the digital media content is not to be automatically purchased (NO, step 350), at step 355, the search results may optionally be displayed. The search results may be displayed in a manner to allow a user to be able to compare content and/or content providers. For example, the client software may display search results that include information about the piece of digital media content and information related to the content provider. Information related to the piece of digital media content may include such information as the name of the piece of digital media content, digital media format, the duration, the name of the artist, the album name, the copyright date, or other information about the piece. Information related to the content provider may include such information as the name of the content provider, the price of the digital media content, the nature of the feedback from other users about the content provider, or other such information. Such information may be useful to a user in determining which, if any, of the digital media content the user desires to obtain.

Various features of the invention discussed above may be practiced alone or in network environments with many types of computer system configurations, including digital media players, satellite radio receivers, FM transmitters or receivers, DAB transmitters or receivers, personal computers, handheld devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the device may include computer-readable digital media for carrying or having computer-executable instructions or data structures stored thereon. Such computer-readable digital media can be any available digital media that can be accessed by a portable device or general purpose or special purpose computer. By way of example, and not limitation, such computer-readable digital media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a portable device or general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable digital media. Computer-executable instructions comprise, for example, instructions and data which cause a general purpose computer, special purpose computer, or special purpose processing device to perform a certain function or group of functions.

Although not required, the invention may be described in the general context of computer-executable instructions, such as program modules, being executed by computers in network environments. Generally, program modules include acts, routines, programs, objects, components, data structures, etc. that perform particular tasks or implement particular abstract data types. Computer-executable instructions, associated data structures, and program modules represent examples of the program code means for executing acts of the methods disclosed herein. The particular sequence of such executable instructions or associated data structures represents examples of corresponding acts for implementing the functions described in such acts.

The devices may also include a magnetic hard disk drive for reading from and writing to a magnetic hard disk, a magnetic disk drive for reading from or writing to a removable magnetic disk, or an optical disk drive for reading from or writing to removable optical disk such as a CD-ROM or other optical digital media. The device may also include non-volatile memory including flash memory. The drives and their associated computer-readable digital media provide non-volatile storage of computer-executable instructions, data structures, program modules and other data. Although the exemplary environment described herein may employ a magnetic hard disk, a removable magnetic disk and/or a removable optical disk, other types of computer readable digital media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk, optical disk, ROM or RAM, including an operating system, one or more application programs, other program modules, and program data. A user may enter commands and information through a keyboard, pointing device, or other input devices (not shown), such as a microphone, joy stick, touch pad, game pad, satellite dish, scanner, or the like. These and other input devices are often connected to the processing unit through a universal serial bus (USB) or serial port interface coupled to system bus. Alternatively, the input devices may be connected by other interfaces, such as a parallel port, or a game port. A display device is also connected to system bus via an interface, such as video adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatically acquiring a digital copy of a song that is being received over a radio channel and played on a device, the method comprising:
   receiving, at the device, user preferences for purchasing digital copies of songs, the user preferences including a minimum bitrate for the digital copies;
   receiving, at the device, a transmission of a radio channel that is currently playing a song;
   tuning the device to the radio channel such that the song is played on the device;
   while the song is being played, receiving user input that requests that a digital copy of the song being played be acquired;
   analyzing the data, associated with the song, that is transmitted over the radio channel to determine one or more characteristics of the song being played;
   using the determined one or more characteristics to search over the internet a plurality of audio content providers to locate a digital copy of the song that is available to be purchased at each of the plurality of audio content providers;
   receiving information from each of the plurality of audio content providers that indicate characteristics of the digital copy of the song that is available to be purchased at the audio content provider, the characteristics including at least a price and a bitrate of the digital copy of the song;
   using the user preferences stored on the device to automatically determine which of the digital copies of the song is to be purchased including selecting digital copies having a bitrate that at least equals the minimum bitrate specified by the user preferences, and selecting a least expensive digital copy from among the digital copies that have a bitrate that at least equals the minimum bitrate; and
   upon purchasing the automatically determined digital copy, downloading, to the device, the automatically determined digital copy of the song from the corresponding audio content provider.

2. The method of claim 1 wherein the radio channel comprises one of: a terrestrial radio channel, an internet radio channel, or a satellite radio channel.

3. The method of claim 1 wherein receiving user input comprises detecting a selection of a button, key, or icon on the device.

4. The method of claim 1 wherein analyzing data associated with the song comprises extracting metadata about the song, the metadata including one or more of a title, an artist, a genre, or an album of the song.

5. The method of claim 1 further, comprising:
   prior to searching the plurality of audio content providers to locate a digital copy of the song, determining that the device stores a digital copy of the song;
   comparing a bitrate of the stored digital copy of the song to the minimum bitrate defined in the user preferences; and
   upon determining that the bitrate of the stored digital copy of the song is less than the minimum bitrate, searching the plurality of audio content providers to locate a digital copy of the song having a bitrate at least equal to the minimum bitrate to replace the stored digital copy of the song.

6. An audio device storing computer executable instructions which when executed perform a method for automatically acquiring a digital copy of audio content that is being received and played on a device, the method comprising:
   receiving, at the audio device, user references for purchasing digital copies of songs, the user preferences including a minimum bitrate for the digital copies;
   receiving, at the audio device, a transmission comprising a satellite radio channel that carries audio content including a plurality of songs, as well as metadata of each of the plurality of songs;
   outputting the audio content of the satellite radio channel;
   while a first song of the audio content is being output, receiving user input that requests that a digital copy of the first song be acquired;
   analyzing the metadata of the first song to determine one or more characteristics of the first song;
   using the metadata to determine that the device stores a digital copy of the first song;
   comparing a bitrate of the stored digital copy of the first song to the minimum bitrate defined in the user references;
   determining that the bitrate of the stored digital copy of the first song is less than the minimum bitrate such that a digital copy of the first song having a bitrate at least equal to the minimum bitrate should be obtained;
   using the determined one or more characteristics to search a plurality of audio content providers over the internet to locate a digital copy of the first song that is available to be purchased at each of the plurality of audio content providers;
   receiving from each of the plurality of audio content providers a price and a bitrate of a digital copy of the first song that is available to be purchased at the audio content provider;
   using the user preferences stored on the device to automatically determine which of the digital copies is to be purchased including selecting digital copies having a bitrate that at least equals the minimum bitrate specified by the user preferences, and selecting a least expensive digital copy from among the digital copies that have a bitrate that at least equals the minimum bitrate; and
   upon purchasing the automatically determined digital copy, downloading, to the device, the automatically determined digital copy from the corresponding audio content provider to replace the stored digital copy of the first song.

7. The device of claim 6 wherein the radio channel comprises one of: a terrestrial radio channel, an internet radio channel, or a satellite radio channel.

8. The device of claim 6 wherein receiving user input comprises detecting a selection of a button, key, or icon on the device.

9. The device of claim 6 wherein analyzing data associated with the song comprises extracting metadata about the song, the metadata including one or more of a title, an artist, a genre, or an album of the song.

10. An audio device storing computer executable instructions which when executed perform a method for automatically acquiring a digital copy of audio content that is being received and played on a device, the method comprising:
  receiving, at the audio device, user preferences for purchasing digital copies of songs, the user preferences including a minimum bitrate for the digital copies;
  receiving, at the audio device, a transmission comprising a satellite radio channel that carries audio content including a plurality of songs, as well as metadata of each of the plurality of songs;
  outputting the audio content of the satellite radio channel;
  while a first song of the audio content is being output, receiving user input that requests that a digital copy of the first song be acquired;
  analyzing the metadata of the first song to determine one or more characteristics of the first song;
  using the determined one or more characteristics to search plurality of audio content providers over the internet to locate a digital copy of the first song that is available to be purchased at each of the plurality of audio content providers;
  receiving from each of the plurality of audio content providers a price and a bitrate of a digital copy of the first song that is available to be purchased at the audio content provider;
  using the user preferences stored on the device to automatically determine which of the digital copies is to be purchased including selecting digital copies having a bitrate that at least equals the minimum bitrate specified by the user preferences, and selecting a least expensive digital copy from among the digital copies that have a bitrate that at least equals the minimum bitrate; and
  upon purchasing the automatically determined digital copy, downloading, to the device, the automatically determined digital copy from the corresponding audio content provider.

11. The audio device of claim 10, wherein the method performed by the execution of the computer executable instructions stored on the audio device further comprises:
  prior to using the determined one or more characteristics to search plurality of audio content providers over the internet to locate a digital copy of the first song that is available to be purchased at each of the plurality of audio content providers, determining that the user has rights to receive a transmission of the first song on a subscription basis; and
  determining that the user input requests that a permanent digital copy of the first song be obtained.

12. The audio device of claim 10, wherein the method performed by the execution of the computer executable instructions stored on the audio device further comprises:
  while a second song is being played over the radio channel on the device, receiving user input that requests that a digital copy of the second song be acquired;
  in response to the user input, determining that the user has rights to a digital copy of the second song; and
  in response to the determination that the user has rights to a digital copy of the second song, refraining from searching for or obtaining a digital copy of the second song.

* * * * *